United States Patent
Ozcan et al.

(10) Patent No.: US 12,536,163 B2
(45) Date of Patent: Jan. 27, 2026

(54) FOUNDATIONAL MACHINE LEARNING MODEL FOR LEARNED DATABASE TASKS

(71) Applicant: Google LLC, Mountain View, CA (US)

(72) Inventors: Fatma Ozcan, San Jose, CA (US); Ioannis Chronis, Los Gatos, CA (US); Yu Gan, Seattle, WA (US); Carsten Binnig, Elztal (DE); Johannes Wehrstein, Darmstadt (DE); Shobha Vasudevan, Palo Alto, CA (US); Yawen Wang, Bellevue, WA (US)

(73) Assignee: Google LLC, Mountain View, CA (US)

( * ) Notice: Subject to any disclaimer, the term of this patent is extended or adjusted under 35 U.S.C. 154(b) by 31 days.

(21) Appl. No.: 18/642,027

(22) Filed: Apr. 22, 2024

(65) Prior Publication Data

US 2025/0209069 A1    Jun. 26, 2025

(30) Foreign Application Priority Data

Dec. 22, 2023 (GR) .............................. 20230101068

(51) Int. Cl.
  *G06F 16/245*  (2019.01)
  *G06F 16/2453*  (2019.01)
(52) U.S. Cl.
  CPC ...... *G06F 16/245* (2019.01); *G06F 16/24542* (2019.01)
(58) Field of Classification Search
  CPC ............. G06F 16/245; G06F 16/24524; G06F 16/24542
  See application file for complete search history.

(56) References Cited

U.S. PATENT DOCUMENTS

| | | |
|---|---|---|
| 2020/0349161 A1 | 11/2020 | Siddiqui et al. |
| 2022/0138199 A1* | 5/2022 | Idicula ................. G06N 3/048 707/718 |
| 2022/0284023 A1 | 9/2022 | Li et al. |
| 2024/0257209 A1* | 8/2024 | Wang ................. G06Q 30/0631 |
| 2024/0338395 A1* | 10/2024 | Zhong ................. G06N 3/0475 |

FOREIGN PATENT DOCUMENTS

CN          114995903 A  *  9/2022  ............. G06F 16/35

OTHER PUBLICATIONS

International Search Report and Written Opinion for International Application No. PCT/US2024/041455 dated Nov. 14, 2024. 14 pages.
Agrawal, M., et al., "Large Language Models are Few-Shot Clinical Information Extractors", arXiv:2205.12689v2 [cs.CL] Nov. 30, 2022. 26 pages.

(Continued)

*Primary Examiner* — James E Richardson
(74) *Attorney, Agent, or Firm* — Lerner David LLP

(57) ABSTRACT

Aspects of the disclosure are directed to a foundational model for learned database tasks. The foundational model can be task-independent and used with low overhead to accomplish various learned database tasks. The foundational model can include a plurality of expert sub-models, each pre-trained to be utilized alone or in combination based on the database task. The foundational model can accomplish the various learned database tasks with reduced training overhead by relying on one or more particular expert sub-models based on the database task at hand.

20 Claims, 7 Drawing Sheets

(56) References Cited

OTHER PUBLICATIONS

Akdere, M., et al., "Learning-based Query Performance Modeling and Prediction", 2012 IEEE 28th International Conference on Data Engineering, Apr. 2012. pp. 390-401.

Alayrac, J., et al., "Flamingo: a Visual Language Model for Few-Shot Learning", Advances in neural information processing systems 35, Dec. 2022. pp. 23716-23736.

Bommasani, R., et al., "On the Opportunities and Risks of Foundation Models", arXiv:2108.07258v3 [cs.LG] Jul. 12, 2022. 214 pages.

Brockschmidt, M., et al., "GNN-FiLM: Graph Neural Networks with Feature-wise Linear Modulation", Proceedings of the 37th International Conference on Machine Learning, ICML 2020, Jul. 13-18, 2020, Virtual Event (Proceedings of Machine Learning Research), vol. 119. PMLR. pp. 1144-1152.

Brown, T., et al., "Language Models are Few-Shot Learners", arXiv:2005.14165 [cs] Jul. 2020. 25 pages.

Devlin, J., et al., "BERT: Pre-training of Deep Bidirectional Transformers for Language Understanding", arXiv preprint arXiv:1810.04805. Oct. 11, 2018. 16 pages.

Ding, J., et al., "ALEX: An Updatable Adaptive Learned Index", Research 11: Machine Learning for Databases II, Jun. 2020. 16 pages.

Hilprecht, B., et al., "Zero-Shot Cost Models for Out-of-the-box Learned Cost Prediction" arXiv:2201.00561v1 [cs.DB] Jan. 3, 2022. 14 pages.

Hilprecht, B., et al., "DeepDB: Learn from Data, not from Queries!", arXiv:1909.00607v1 [cs.DB] Sep. 2, 2019. 13 pages.

Kraska, T., et al., "The Case for Learned Index Structures", Research 6: Storage & Indexing, SIGMOD' 18, Jun. 2018. 16 pages.

Li, G., et al., "AI Meets Database: AI4DB and DB4AI" SIGMOD '21: International Conference on Management of Data, Virtual Event, China, Jun. 20-25, 2021. pp. 2859-2866.

Lu, Y., et al., "Pre-training Summarization Models of Structured Datasets for Cardinality Estimation", Proc. VLDB Endow. 15, Nov. 3, 2021. pp. 414-426.

Marcus, R., et al., "Plan-Structured Deep Neural Network Models for Query Performance Prediction", arXiv:1902.00132v1 [cs.DB] Jan. 31, 2019. 16 Pages.

Motl, J., et al., "The Prague Relational Learning Repository", arXiv:1511.03086v2 [cs.LG] Mar. 11, 2024. 9 pages.

Negi, P., et al., "Robust Qery Driven Cardinality Estimation under Changing Workloads", Proceedings of the VLDB Endowment. Feb. 1, 2023. pp. 1520-1533.

Paul, D., et al., "Database Workload Characterization with Query Plan Encoders", arXiv:2105.12287v1 [cs.DB] May 26, 2021. 14 pages.

Phothilimthana, P., et al., "TpuGraphs: A Performance Prediction Dataset on Large Tensor Computational Graphs", 37th Conference on Neural Information Processing Systems (NeurIPS 2023) Track on Datasets and Benchmarks, Feb. 2024. 21 pages.

Scholak, T., et al., "PICARD: Parsing Incrementally for Constrained Auto-Regressive Decoding from Language Models", arXiv:2109.05093v1 [cs.CL] Sep. 10, 2021. 7 pages.

Sun., J., et al., "Learned Cardinality Estimation: A Design Space Exploration and a Comparative Evaluation", Proceedings of the VLDB Endowment 15.1, Sep. 2021. pp. 85-89.

Tang, X., et al., "PreQR: Pre-training Representation for SQL Understanding", Proceedings of the 2022 International Conference on Management of Data, Jun. 2022. pp. 204-216.

Wu, C., et al., "Visual ChatGPT: Talking, Drawing and Editing with Visual Foundation Models", arXiv:2303.04671v1 [cs.CV] Mar. 8, 2023, 17 pages.

Zhong, V., et al., "SEQ2SQL: Generating Structured Queries From Natural Language Using Reinforcement Learning", arXiv:1709.00103v7 [cs.CL] Nov. 9, 2017. 12 pages.

Zhu, R., et al., "FLAT: Fast, Lightweight and Accurate Method for Cardinality Estimation", arXiv:2011.09022v5 [cs.DB] May 19, 2021. 20 pages.

* cited by examiner

FOUNDATIONAL MACHINE LEARNING MODEL FOR LEARNED DATABASE TASKS

CROSS-REFERENCE TO RELATED APPLICATIONS

The present application claims priority from Greek Patent Application No. 20230101068, filed Dec. 22, 2023, the disclosure of which is hereby incorporated herein by reference.

BACKGROUND

Task and instance specific machine learning models have been developed for various database tasks, such as learned indexes, cardinality estimation, query optimization, workload management, and/or query rewrites. However, these machine learning models have high training costs and are prohibitively expensive to deploy at scale, due to training separate models for each task, dataset, and/or query workload combination. While current generative models, like large language models, can solve different tasks with one model, these generative models have extremely high inference costs of up-to-seconds which render them unattractive for any performance critical database task, such as cardinality and cost estimation during query planning. Further, these generative models involve extensive amounts of data for training, where a training corpus of a similar size would not be feasible to construct for learning database tasks.

BRIEF SUMMARY

Aspects of the disclosure are directed to a foundational model for learned database tasks. The foundational model can be task-independent and used with low overhead to accomplish various learned database tasks, such as cardinality estimation, query optimization, workload management, and/or query rewrites. The foundational model can include a plurality of expert sub-models, each pre-trained to be utilized alone or in combination based on the database task. As an example, the expert sub-models can be graph neural network (GNN)-based models. The foundational model can accomplish the various learned database tasks with reduced training overhead by relying on one or more particular expert sub-models based on the database task at hand.

An aspect of the disclosure provides for a method for serving a foundational model for learned database tasks, the method including: receiving, by one or more processors, a query and one or more tables associated with a database task; selecting, by the one or more processors, a downstream model based on the database task; processing, by the one or more processors, the query using the downstream model to generate a response for the database task by providing the downstream model with a representation of one or more expert sub-models pre-trained for the database task; and outputting, by the one or more processors, the response for the database task.

Another aspect of the disclosure provides for a system including: one or more processors; and one or more storage devices coupled to the one or more processors and storing instructions that, when executed by the one or more processors, cause the one or more processors to perform operations for the method for serving a foundational model for learned database tasks. Yet another aspect of the disclosure provides for a non-transitory computer readable medium for storing instructions that, when executed by one or more processors, cause the one or more processors to perform operations for the method for serving a foundational model for learned database tasks.

In an example, the database task includes at least one of cardinality estimation, approximate query answering, partitioning advisors, knob tuning, query scheduling, query optimization, runtime estimation, index selection, data imputation, text-to-structured query language (SQL), or query rewriting.

In another example, the one or more expert sub-models include base experts and derived experts. In yet another example, the base experts include machine learning models respectively pre-trained in isolation from other expert sub-models. In yet another example, the base experts include at least one of data experts or resources experts. In yet another example, the derived experts include machine learning models respectively pre-trained using representations derived from other expert sub-models. In yet another example, the derived experts include at least one of physical plan experts or logical plan experts. In yet another example, the representation of one or more expert sub-models includes a combination of at least one base expert and at least one derived expert, the at least one derived expert being dependent on the at least one base expert.

In yet another example, the downstream model is trained for the database task. In yet another example, the downstream model is one of a plurality of downstream models that are part of the foundational model, each downstream model trained for a particular database task.

DETAILED DESCRIPTION

The technology generally relates to a foundational model for learned database tasks. The foundational model can accomplish various learned database tasks independently and with reduced training overhead. The foundational model can include a plurality of expert sub-models, each configured to learn a representation of a particular database task. The expert sub-models can include base models and derived models that depend on one or more of the base models. The expert sub-models can be graph neural network (GNN)-based models, as an example. The foundational model can further include a plurality of downstream models, each configured to utilize respective representations of a particular database task from the expert sub-models to accomplish that particular database task.

Figure 1:
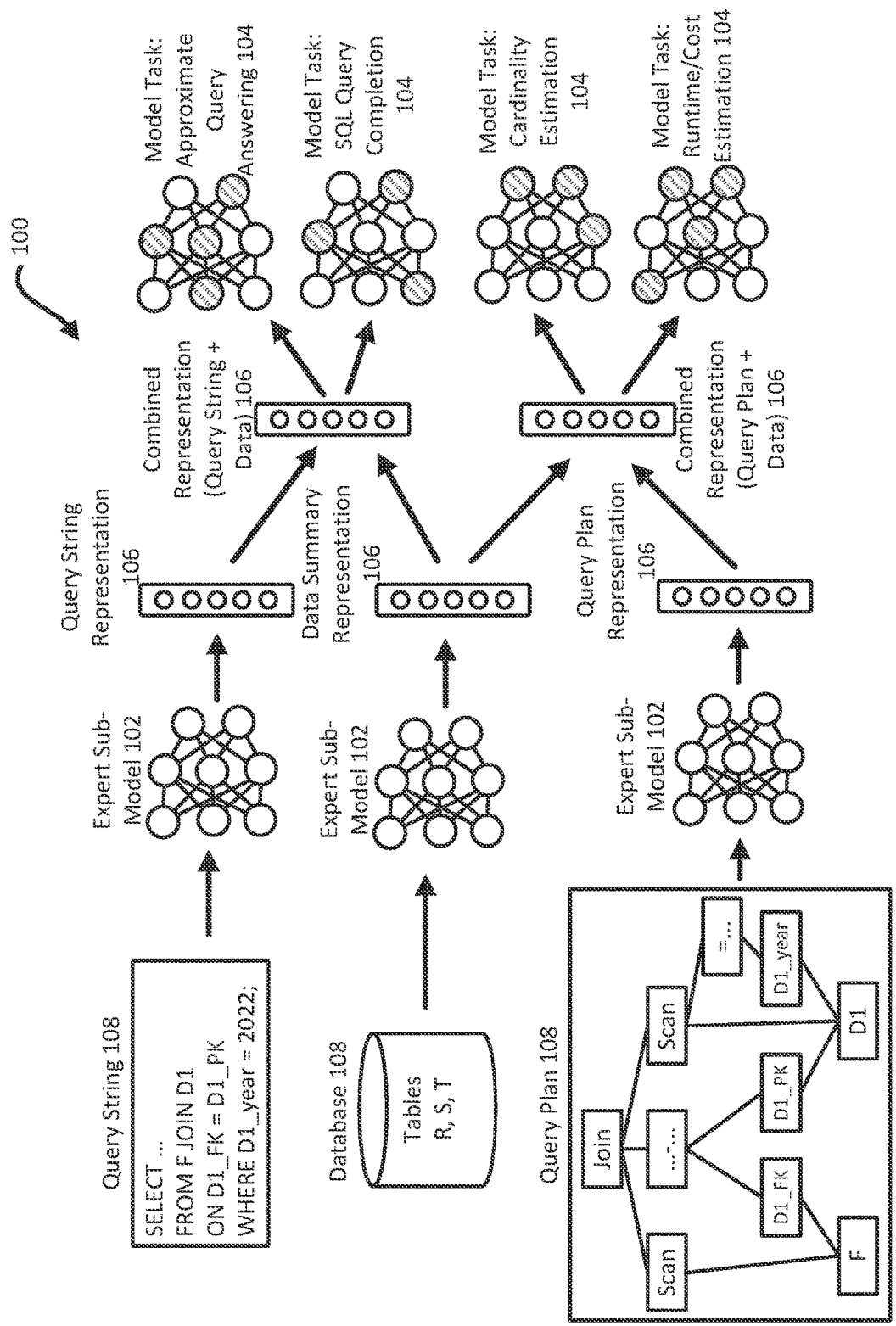
FIG. 1 depicts a block diagram of an example foundation model according to aspects of the disclosure.

FIG. 1 depicts a block diagram of an example foundation model 100. In contrast to using an extremely large-scale model with a large number of parameters, the foundation model 100 is based on various smaller expert sub-models 102. While FIG. 1 depicts three expert sub-models, the foundation model 100 can include any number of expert sub-models. The expert sub-models 102 can respectively use a fraction of the parameters and can respectively be trained with a smaller-sized training corpus while still allowing the foundation model to maintain sufficient accuracy levels on various database tasks 104, such as approximate query answering, SQL query completion, cardinality estimation, and/or runtime/cost estimation. Database tasks 104 can respectively depend on a smaller set of structured data, logical and physical query plans, and available resources. Therefore, training smaller expert sub-models 102 to respectively learn representations 106 for these individual inputs 108, the foundation model 100 can solve for the particular database tasks 104 at hand using a downstream model.

As examples, the inputs 108 can include query strings, data from databases, and/or query plans, and the representations 106 can be representations of query strings, data from databases, and/or query plans. Further, the representations 106 for these inputs 108 can be combined to improve accuracy while also saving storage space. For example, query string and data summary representations can be combined to form a query string/data representation. As another example, data summary and query plan representations can be combined to form a query plan/data representation. The foundation model 100 can input the query string/data representation to one or more downstream models to perform database tasks, such as approximate query answering and SQL query completion, and the found model 100 can input the query plan/data representation to one or more downstream models to perform database tasks, such as cardinality estimation and runtime/cost estimation.

The expert sub-models 102 can have model architectures tailored for their respective inputs, such as graph-based networks to learn plan representation. These architectures allow for efficient training with smaller amounts of training data. This can improve processing speed and reduce memory usage. An example expert sub-model 102 can be a model configured to summarize tabular data. The model can compute data representations 106 for database management tasks, such as cardinality or cost estimation, as well as compute representations 106 for tasks that involve an understanding of the data, such as approximate query processing or suggesting missing values. These representations 106 can also be combined with other representations from other expert sub-models 102. For example, a representation that combines information of query plans and data into a joint vector can be used for any task based on these two inputs, such as cardinality or cost estimation.

To implement a learned database task, the foundation model 100 cascades a set of task-specific downstream models, which receive the representations 106 as input data and generate responses to particular database tasks as output data. Similar to the expert sub-models, the task-specific downstream models are smaller models that can be trained with less processing cost and memory usage compared to generative models, like large language models.

Figure 2:
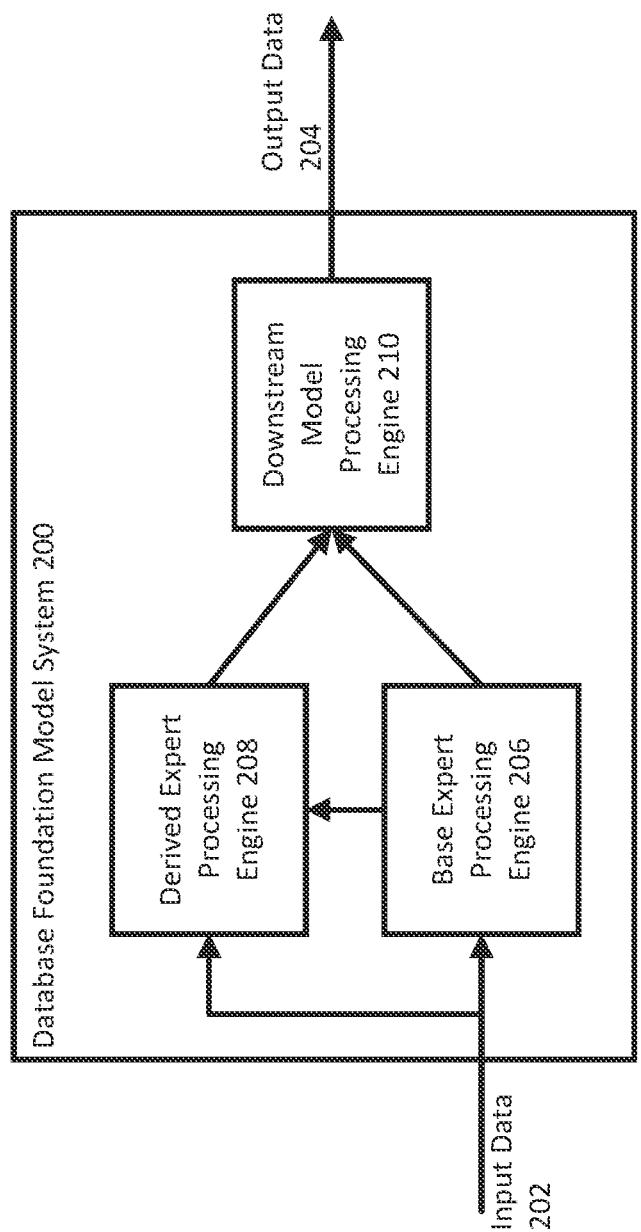
FIG. 2 depicts a block diagram of a database foundation model system for performing various database tasks according to aspects of the disclosure.

FIG. 2 depicts a block diagram of database foundation model system 200 for performing various database tasks. The database foundation model system 200 can be implemented on one or more computing devices in one or more locations.

The database foundation model system 200 can be configured to receive input data 202. For example, the database foundation model system 200 can receive the input data 202 as part of a call to an application programming interface (API) exposing the database foundation model system 200 to one or more computing devices. The input data 202 can also be provided to the database foundation model system 200 through a storage medium, such as remote storage connected to the one or more computing devices over a network. The input data 202 can further be provided as input through a user interface on a client computing device coupled to the database foundation model system 200. The input data 202 can include training data and inference data. The training data can include data associated with training the expert sub-models and downstream models for various database tasks, such as queries and table features. The inference data can include data associated with performing the various database tasks via the expert sub-models and downstream models, such as query strings, query plans, and/or table data from databases.

From the input data 202, the database foundation model system 200 can be configured to output one or more results generated as output data 204. The output data 204 can include a response to a query for performing a particular database task. As an example, the database foundation model system 200 can be configured to send the output data 204 for display on a client or user display. As another example, the database foundation model system 200 can be configured to provide the output data 204 as a set of computer-readable instructions, such as one or more computer programs. The computer programs can be written in any type of programming language, and according to any programming paradigm, e.g., declarative, procedural, assembly, object-oriented, data-oriented, functional, or imperative. The computer programs can be written to perform one or more different functions and to operate within a computing environment, e.g., on a physical device, virtual machine, or across multiple devices. The computer programs can also implement functionality described herein, for example, as performed by a system, engine, module, or model. The database foundation model system 200 can further be configured to forward the output data 204 to one or more other devices configured for translating the output data for display or into an executable program written in a computer programming language. The database foundation model system 200 can also be configured to send the output data 204 to a storage device for storage and later retrieval.

The database foundation model system 200 can include a base expert processing engine 206, a derived expert processing engine 208, and a downstream model processing engine 210. The base expert processing engine 206, derived expert processing engine 208, and downstream model processing engine 210 can be implemented as one or more computer programs, specially configured electronic circuitry, or any combination thereof.

The base expert processing engine 206 can be configured to process one or more base expert sub-models while the derived expert processing engine 208 can be configured to process one or more derived expert sub-models. Base experts can be trained independently from other experts while derived experts can be trained based on other experts, either base experts or other derived experts.

Example base experts can include data experts or resource experts. A data expert can be a model that learns to summarize tabular data as a vector in latent space, such as learning to summarize data along rows and columns. A resource expert can be a model that learns to represent performance of hardware resources, e.g., virtual machines, as a vector in latent space. The vector here can aggregate all performance-relevant characteristics, such as input/output speed or computational power of central processing units derived with standard benchmarks.

Example derived experts can include logical plan experts or physical plan experts. Logical plan experts can be trained based on outputs from data experts, and physical plan experts can be trained based on outputs from logical plan experts. A logical plan expert can be a model that learns to capture information on how query operators, such as joins or filters, transform the data of tables from the data experts. For example, the logical plan expert can learn that the representation of a filter operation applied to an input table should capture the characteristics of the filter predicate applied to the input table. A physical plan expert can be a model that builds on top of the logical plan representation to enrich that representation with the complexity of running the actual query processing, such as a nested loop or hash join.

The base expert processing engine 206 can be configured to compute representations of the input data 202, e.g., vectors representing query strings, table data, or query plans, using one or more base expert sub-models. The derived expert processing engine 208 can be configured to compute combined representations of the representations from the base expert sub-models, e.g., vectors combining the representations of query strings, table data, or query plans, using one or more derived expert sub-models. In computing the combined representations, the derived expert processing engine 208 can enrich the representations from the base expert sub-models based on additional information received as part of the input data 202, such as table and/or column level statistics about the data, prior query history, and/or any information that could impact the performance of the query, e.g., number of parallel nodes available for processing.

The expert sub-models are pre-trained to be used with reduced overhead for solving the various downstream database tasks. To reflect the dependency between derived and base experts, the experts are pre-trained in a bottom-up manner. The base expert processing engine 206 can be configured to pre-train the base experts, such as the data expert, and the derived expert processing engine 208 can be configured to incrementally train the derived experts, such as the logical plan expert, while freezing, e.g., no longer training, the previously trained base experts. The expert sub-models are pre-trained to learn the intrinsic characteristics of the aspect they represent in a database task-independent manner. For example, a data expert can learn to represent table summaries as a vector in latent space to capture relevant information, e.g., data distributions, independent of the downstream task.

The downstream model processing engine 210 can be configured to process the representations from the experts, e.g., base, derived or combination thereof, to output a result for a downstream task. Based on output representations from one or more experts, the downstream model processing engine 210 can train downstream models with task-specific training data from particular experts.

Example database tasks can include cardinality estimation, approximate query answering, partitioning advisors, knob tuning, query scheduling, query optimization, runtime estimation, and/or index selection. A cardinality estimation model can process representations from a data expert and a logical plan expert. An approximate query answering model can process representations from a data expert and a logical plan expert. A partitioning advisor model can process representations from a data expert and a physical plan expert.

A knob tuning model can process representations from a data expert, resources expert, and physical plan expert. A query scheduling model can process representations from a data expert, resources expert, and physical plan expert. A query optimization model can process representations from a data expert, resources expert, and physical plan expert. A runtime estimation model can process representations from a data expert, resources expert, and physical plan expert. An index selection model can process representations from a data expert, resources expert, and a logical plan expert.

For example, the representation of the logical plan expert, which combines information from logical query plans and data from databases, can be input and processed by a regression model for cardinality estimation. While the task-specific models are trained per downstream task, once trained, the task-specific model do not need to be retrained for different datasets and/or workloads as the representations from the experts can capture information about workload, e.g., query plans, and dataset, e.g., tabular data, in a transferrable manner, e.g., encoding table values using relative encodings normalized to a unified range like 0 to 1. The downstream model processing engine 210 can be configured to incrementally train the downstream models while freezing relevant, previously trained experts, such as freezing the data expert, logical plan expert, and physical plan expert for training a runtime estimation model.

Figure 3:
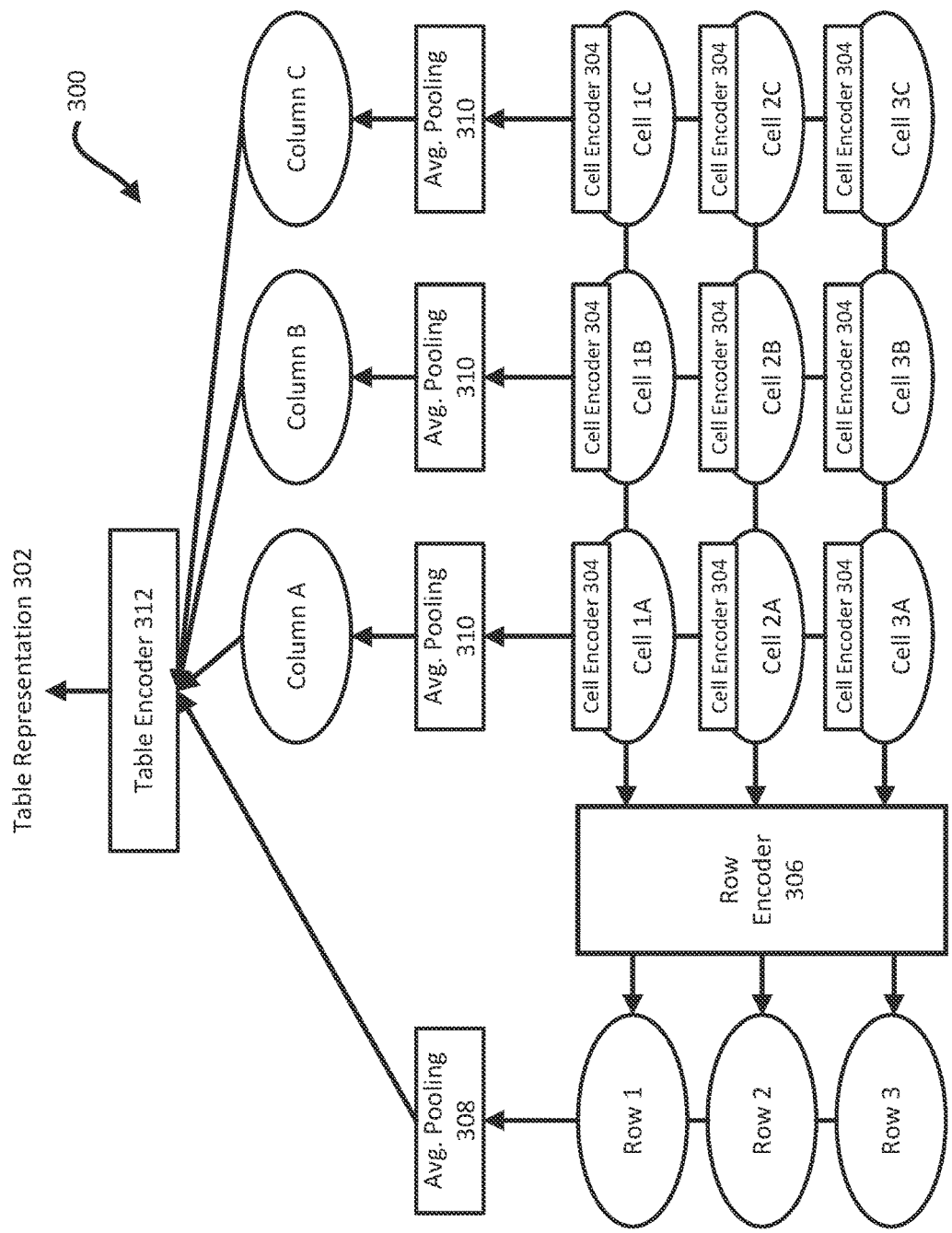
FIG. 3 depicts a block diagram of an example data expert sub-model according to aspects of the disclosure.

FIG. 3 depicts a block diagram of an example data expert sub-model 300. The data expert sub-model 300 can be part of the base expert processing engine 206 as depicted in FIG. 2. The data expert sub-model 300 is configured to learn representations of tabular data, where the representations capture important data characteristics for a spectrum of possible database tasks that are supported directly from the output of the data expert sub-model 300 or by further processing the representation by other derived expert sub-models. The data expert sub-model 300 can capture data characteristics at the cell levels and can aggregate the cell level data characteristics along rows and columns to capture data characteristics at the row and column levels as well. Example data characteristics at the column level can include data distributions or other statistics within a column and example data characteristics at the row level can include co-occurrences of data or correlation of data within a row. While FIG. 3 depicts 9 cells arranged in 3 rows by 3 columns, the data expert sub-model 300 can capture data characteristics from any number of cells arranged in any manner, e.g., arranged with any number of rows and/or columns.

For computing a representation of a table 302, the data expert sub-model 300 samples a variable number of rows from a base table and extracts features from them cell by cell via a cell encoder 304, such as a multilayer perceptron. The data expert sub-model 300 can extract features from the cell values by normalizing their values to a value from 0 to 1, allowing for computing distributions and correlations between relative cell values without being tied to actual concrete values in a given table. The data expert sub-model 300 can also add additional statistics about columns to the cell features, such as number of table rows, number of unique values, not a number ratio, and/or histogram information. The data expert sub-model 300 encodes the cell representations into fixed size row representations using a row encoder 306, such as another multi-layer perceptron. The data expert sub-model 300 aggregates the row representations via a row aggregator 308, such as an average pooling unit, to extract correlations and patterns across the rows and columns. Similarly, the data expert sub-model 300 aggregates the cell features of each column via cell aggregators 310, such as average pooling units, to generate column representations. The data expert sub-model 300 encodes the aggregated row representation and the column representations via a table encoder 312, such as a third multilayer perceptron, to generate the table representation 302.

The data expert sub-model 300 can utilize row sampling to allow for the flexibility of increasing or decreasing the number of rows during inference based on latency and/or accuracy requirements without having to retrain the data expert sub-model 300. Further, the data expert sub-model 300 can encode column features to allow for a shuffled order of columns not changing the column representation, resulting in the data expert sub-model 300 being less sensitive to noisy, unseen data in a database schema.

Figure 4:
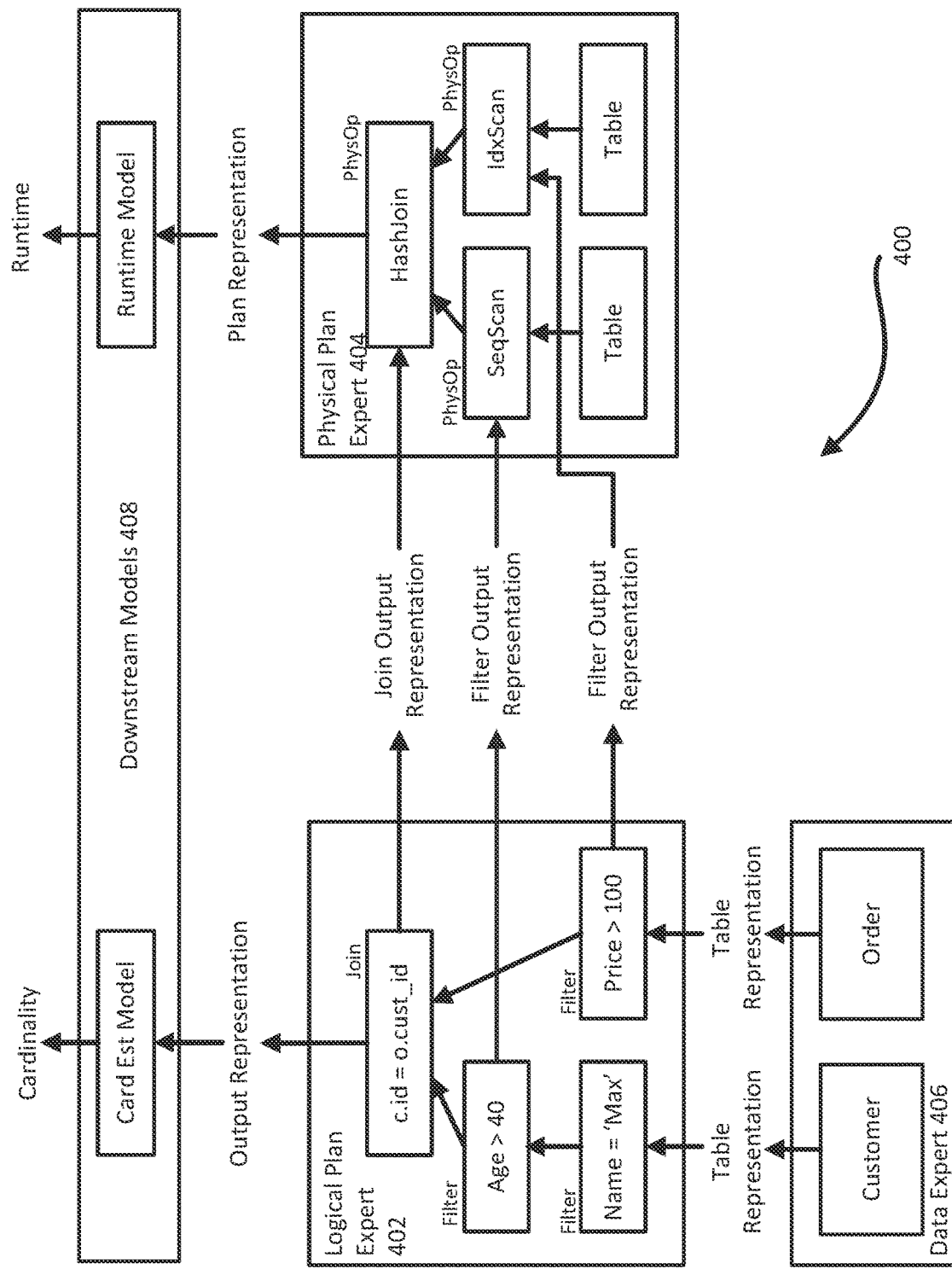
FIG. 4 depicts a block diagram of example derived expert sub-models according to aspects of the disclosure.

FIG. 4 depicts a block diagram of example derived expert sub-models 400. The derived expert sub-models 400 include a logical plan expert sub-model 402 and a physical plan expert sub-model 404, which can be part of the derived expert processing engine 208 as depicted in FIG. 2.

The logical plan expert sub-model 402 can include a graph neural network (GNN) to learn representations of arbitrary logical plans, since a logical plan can be represented by a directed acyclic graph (DAG). Each node in the graph can represent a logical plan operator and edges can represent data flow therebetween. There can be different node types to represent the different plan operators. Example logical plan operators can include tables, filters, and/or joins. The table node types can be initialized by the table representations provided by a data expert sub-model 406. As depicted in FIG. 4, the data expert sub-model 406 can generate table representations for customers and orders. The logical plan expert sub-model 402 can generate an output representation that filters and joins the customers and order based on name and age of customers and prices of orders.

The logical plan expert sub-model 402 can define the details of each operator as node features. For example, a filter operator can include features like filter predicates, e.g., ">" and/or "≥". The logical plan expert sub-model 402 can encode the features with normalized, relative values, such as values from 0 to 1. Topological message passing in the GNN follows the direction of the logical plan graph, from leaf nodes to a single root. In respective iterations of message passing, the GNN, such as a GNN-multilayer perceptron, can combine the incoming message with a hidden state of the node. This staging of intermediate results of applying each operator can model the filter and join operations over the original data. The GNN can read the hidden state of the single root node and pass the hidden state to the downstream models 408, such as for cardinality estimation, as an output representation.

The physical plan expert sub-model 404 can be an extension of the GNN from the logical plan expert sub-model 402. The nodes of the physical plan expert can be physical operators and edges can correspond to the data flow between them. Example physical operators can include hash join, sequential scan, and/or index scan. Respective nodes in the logical plan graph can have corresponding nodes in the physical plan graph describing how the logical operator is executed in terms of physical operators. Both nodes can be connected via an edge allowing the propagation of the logical plan information during message passing. The physical plan expert sub-model 404 can also receive table representations and/or other information provided by a data expert sub-model 406, such as whether data is the inner or outer of a join. Similar to the logical plan expert sub-model 402, the physical plan expert sub-model 404 can read and pass the hidden state of the root node to the downstream models 408, such as for runtime estimation, as a plan representation.

The pre-trained embedding vectors of intermediate results from the logical plan expert sub-model 402 can be passed along connecting edges to the corresponding nodes of the physical plan expert sub-model 404. These intermediate results capture data characteristics relevant for at least estimating runtime. Using pre-trained data characteristics as inputs, along with table representations, allows for providing relevant context for the physical plan to predict runtime estimation with higher accuracy.

Figure 5:
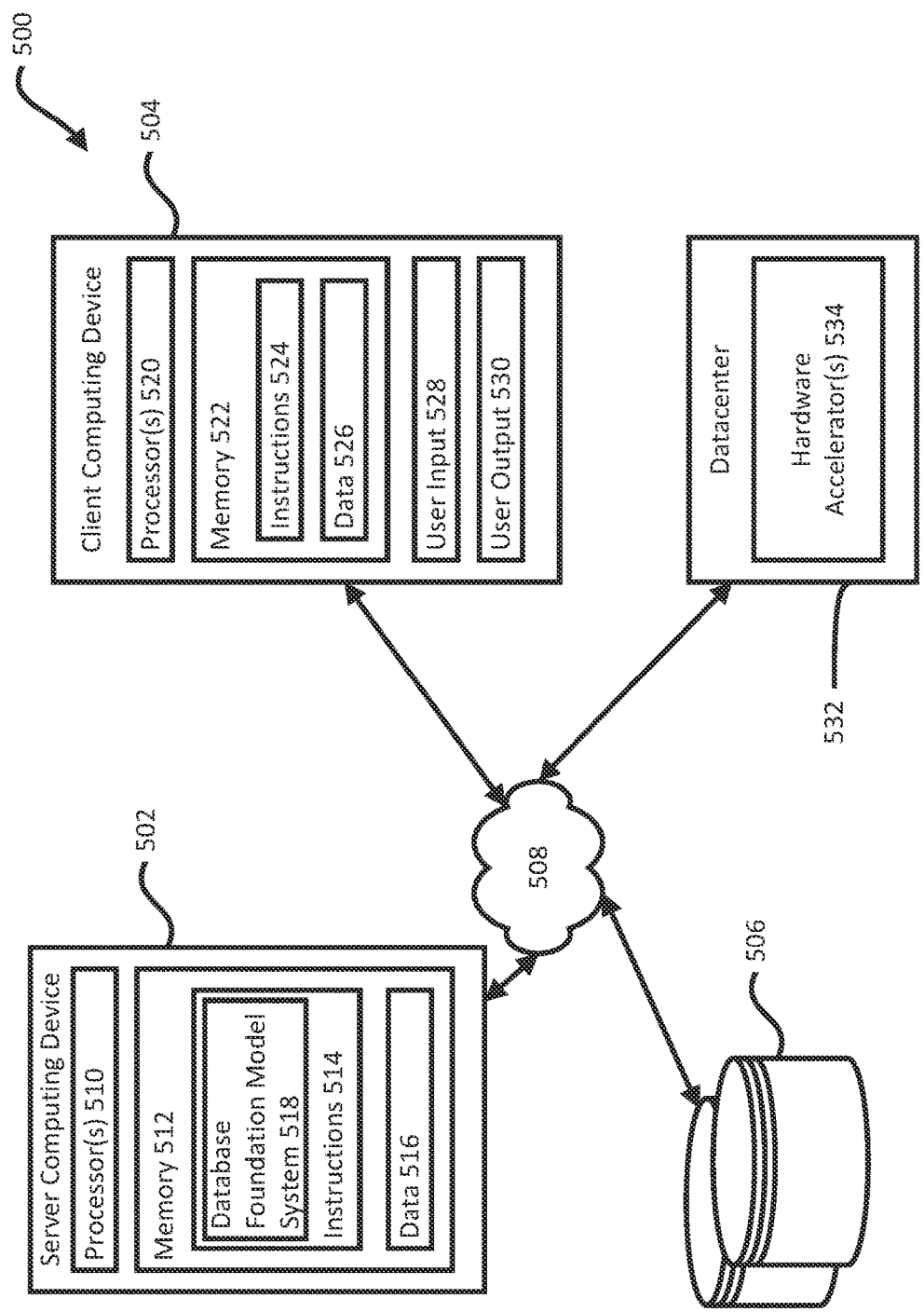
FIG. 5 depicts a block diagram of an example environment for implementing a database foundation model system according to aspects of the disclosure.

FIG. 5 depicts a block diagram of an example environment 500 for implementing a database foundation model system 518. The database foundation model system 518 can be implemented on one or more devices having one or more processors in one or more locations, such as in server computing device 502. Client computing device 504 and the server computing device 502 can be communicatively coupled to one or more storage devices 506 over a network 508. The storage devices 506 can be a combination of volatile and non-volatile memory and can be at the same or different physical locations than the computing devices 502, 504. For example, the storage devices 506 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 502 can include one or more processors 510 and memory 512. The memory 512 can store information accessible by the processors 510, including instructions 514 that can be executed by the processors 510. The memory 512 can also include data 516 that can be retrieved, manipulated, or stored by the processors 510. The memory 512 can be a type of transitory or non-transitory computer readable medium capable of storing information accessible by the processors 510, such as volatile and non-volatile memory. The processors 510 can include one or more central processing units (CPUs), graphic processing units (GPUs), field-programmable gate arrays (FPGAs), and/or application-specific integrated circuits (ASICs), such as tensor processing units (TPUs).

The instructions 514 can include one or more instructions that, when executed by the processors 510, cause the one or more processors 510 to perform actions defined by the instructions 514. The instructions 514 can be stored in object code format for direct processing by the processors 510, or in other formats including interpretable scripts or collections of independent source code modules that are interpreted on demand or compiled in advance. The instructions 514 can include instructions for implementing a database foundation model system 518, which can correspond to the database foundation model system 200 as depicted in FIG. 2. The database foundation model system 518 can be executed using the processors 510, and/or using other processors remotely located from the server computing device 502.

The data 516 can be retrieved, stored, or modified by the processors 510 in accordance with the instructions 514. The data 516 can be stored in computer registers, in a relational or non-relational database as a table having a plurality of different fields and records, or as JSON, YAML, proto, or XML documents. The data 516 can also be formatted in a computer-readable format such as, but not limited to, binary values, ASCII, or Unicode. Moreover, the data 516 can include information sufficient to identify relevant information, such as numbers, descriptive text, proprietary codes, pointers, references to data stored in other memories, including other network locations, or information that is used by a function to calculate relevant data.

The client computing device 504 can also be configured similarly to the server computing device 502, with one or more processors 520, memory 522, instructions 524, and data 526. The client computing device 504 can also include a user input 528 and a user output 530. The user input 528 can include any appropriate mechanism or technique for receiving input from a user, such as keyboard, mouse, mechanical actuators, soft actuators, touchscreens, microphones, and sensors.

The server computing device 502 can be configured to transmit data to the client computing device 504, and the client computing device 504 can be configured to display at least a portion of the received data on a display implemented as part of the user output 530. The user output 530 can also be used for displaying an interface between the client computing device 504 and the server computing device 502. The user output 530 can alternatively or additionally include one or more speakers, transducers or other audio outputs, a haptic interface or other tactile feedback that provides non-visual and non-audible information to the platform user of the client computing device 504.

Although FIG. 5 illustrates the processors 510, 520 and the memories 512, 522 as being within the respective computing devices 502, 504, components described herein can include multiple processors and memories that can operate in different physical locations and not within the same computing device. For example, some of the instructions 514, 524 and the data 516, 526 can be stored on a removable SD card and others within a read-only computer chip. Some or all of the instructions 514, 524 and data 516, 526 can be stored in a location physically remote from, yet still accessible by, the processors 510, 520. Similarly, the processors 510, 520 can include a collection of processors that can perform concurrent and/or sequential operation. The computing devices 502, 504 can each include one or more internal clocks providing timing information, which can be used for time measurement for operations and programs run by the computing devices 502, 504.

The server computing device 502 can be connected over the network 508 to a data center 532 housing any number of hardware accelerators 534. The data center 532 can be one of multiple data centers or other facilities in which various types of computing devices, such as hardware accelerators, are located. Computing resources housed in the data center 532 can be specified for deploying models, such as for various database tasks, as described herein.

The server computing device 502 can be configured to receive requests to process data from the client computing device 504 on computing resources in the data center 532. For example, the environment 500 can be part of a computing platform configured to provide a variety of services to users, through various user interfaces and/or application programming interfaces (APIs) exposing the platform services. As an example, the variety of services can include database tasks, such as cardinality estimation, approximate query answering, partitioning advisors, knob tuning, query scheduling, query optimization, runtime estimation, and/or index selection. The client computing device 504 can transmit input data as part of a query for a task to generate an output for one or more of the various database tasks. The database foundation model system 518 can receive the input data, and in response, generate output data including a response to the query for the database task.

The server computing device 502 can maintain a variety of models in accordance with different constraints available at the data center 532. For example, the server computing device 502 can maintain different families for deploying models on various types of TPUs and/or GPUs housed in the data center 532 or otherwise available for processing.

Figure 6:
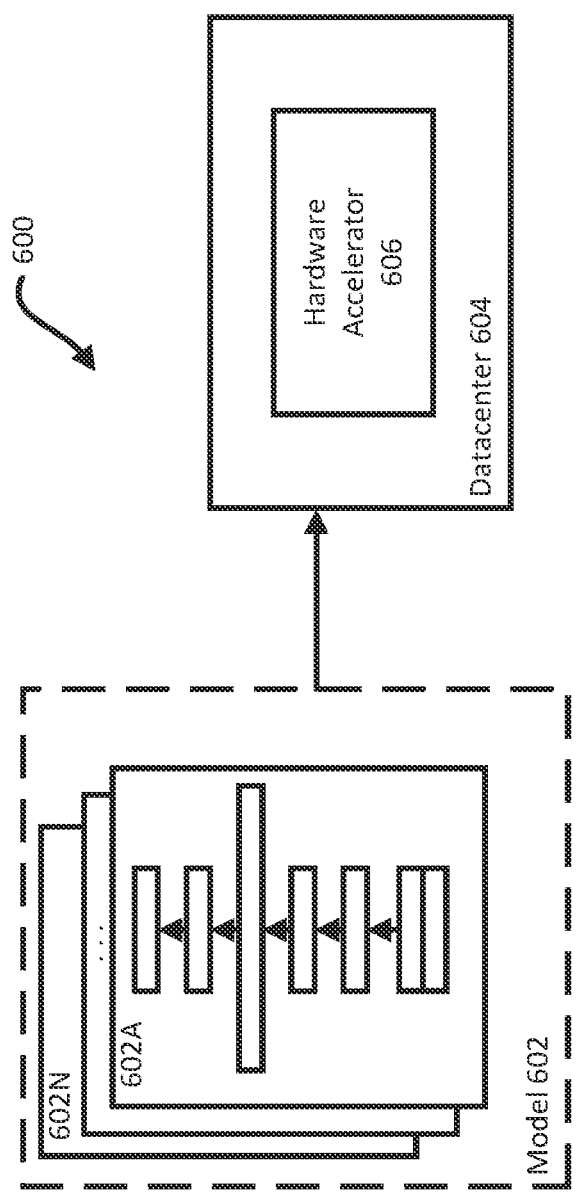
FIG. 6 depicts a block diagram illustrating one or more machine learning model 602 architectures according to aspects of the disclosure.

FIG. 6 depicts a block diagram 600 illustrating one or more machine learning model 602 architectures, more specifically 602A-N for each architecture, for deployment in a datacenter 604 housing a hardware accelerator 606 on which the deployed machine learning models 602 will execute, such as for the variety of services as described herein. The hardware accelerator 606 can be any type of processor, such as a CPU, GPU, FPGA, or ASIC such as a TPU.

An architecture of a machine learning model 402 can refer to characteristics defining the model, such as characteristics of layers for the model, how the layers process input, or how the layers interact with one another. The architecture of the machine learning model 402 can also define types of operations performed within each layer. One or more machine learning model 402 architectures can be generated that can output results, such as for various database tasks as described herein. Example model architectures can correspond to graph neural networks, multilayer perceptrons, or graph neural network multilayer perceptrons.

The machine learning models can be trained according to a variety of different learning techniques. Learning techniques for training the machine learning models can include supervised learning, unsupervised learning, semi-supervised learning, and reinforcement learning techniques. For example, training data can include multiple training examples that can be received as input by a model. The training examples can be labeled with a desired output for the model when processing the labeled training examples. The label and the model output can be evaluated through a loss function to determine an error, which can be back propagated through the model to update weights for the model. For example, a supervised learning technique can be applied to calculate an error between outputs, with a ground-truth label of a training example processed by the model. Any of a variety of loss or error functions appropriate for the type of the task the model is being trained for can be utilized, such as cross-entropy loss for classification tasks, or mean square error for regression tasks. The gradient of the error with respect to the different weights of the candidate model on candidate hardware can be calculated, for example using a backpropagation algorithm, and the weights for the model can be updated. The model can be trained until stopping criteria are met, such as a number of iterations for training, a maximum period of time, a convergence, or when a minimum accuracy threshold is met.

For training of the foundational model overall, the base expert sub-models can be trained first. Because the base expert sub-models are independent of other expert sub-models, they can be trained in parallel using separate training loops. For example, for the data expert sub-model, pre-training is applied on a disjoint set of tables so the data expert sub-model can learn to capture data characteristics in a table-independent manner. The data expert sub-model can be pre-trained on a sample of rows, where the table representations can capture any relevant information for a spectrum of downstream tasks, such as row and/or column statistics for cardinality estimation or restoring cell values of individual rows for approximate query processing.

The derived expert sub-models can then be trained based on the pre-trained base expert sub-models. The base expert sub-models stay frozen during the training of the derived expert sub-models. For example, for the logical plan expert sub-model, the same training tasks are used as for the data expert sub-model but applied on the output of the logical plan expert representing query results instead of single tables. The logical plan expert sub-model can be pretrained based on executing SQL queries on the same data sets as the data expert sub-model. As another example, the data expert sub-model and logical plan expert sub-model stay frozen when pretraining the physical plan expert sub-model. The physical plan expert sub-model can be trained on runtime estimation using physical query plans and their runtime when executing SQL queries of the same complexity as for the logical plan expert sub-model.

Once all base and derived expert sub-model are pre-trained, the sub-models can be trained for zero-shot scenarios to respond to queries for particular database tasks. The sub-models can further be fine-tuned based on particular datasets to improve their ability to respond to database tasks.

Referring back to FIG. 5, the devices 502, 504 and the data center 532 can be capable of direct and indirect communication over the network 508. For example, using a network socket, the client computing device 504 can connect to a service operating in the data center 532 through an Internet protocol. The devices 502, 504 can set up listening sockets that may accept an initiating connection for sending and receiving information. The network 508 can include various configurations and protocols including the Internet, World Wide Web, intranets, virtual private networks, wide area networks, local networks, and private networks using communication protocols proprietary to one or more companies. The network 508 can support a variety of short- and long-range connections. The short- and long-range connections may be made over different bandwidths, such as 2.402 GHz to 2.480 GHz, commonly associated with the Bluetooth® standard, 2.4 GHz and 5 GHz, commonly associated with the Wi-Fi® communication protocol; or with a variety of communication standards, such as the LTE® standard for wireless broadband communication. The network 508, in addition or alternatively, can also support wired connections between the devices 502, 504 and the data center 532, including over various types of Ethernet connection.

Although a single server computing device 502, client computing device 504, and data center 532 are shown in FIG. 5, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device connected to hardware accelerators configured for processing machine learning models, or any combination thereof.

Figure 7:
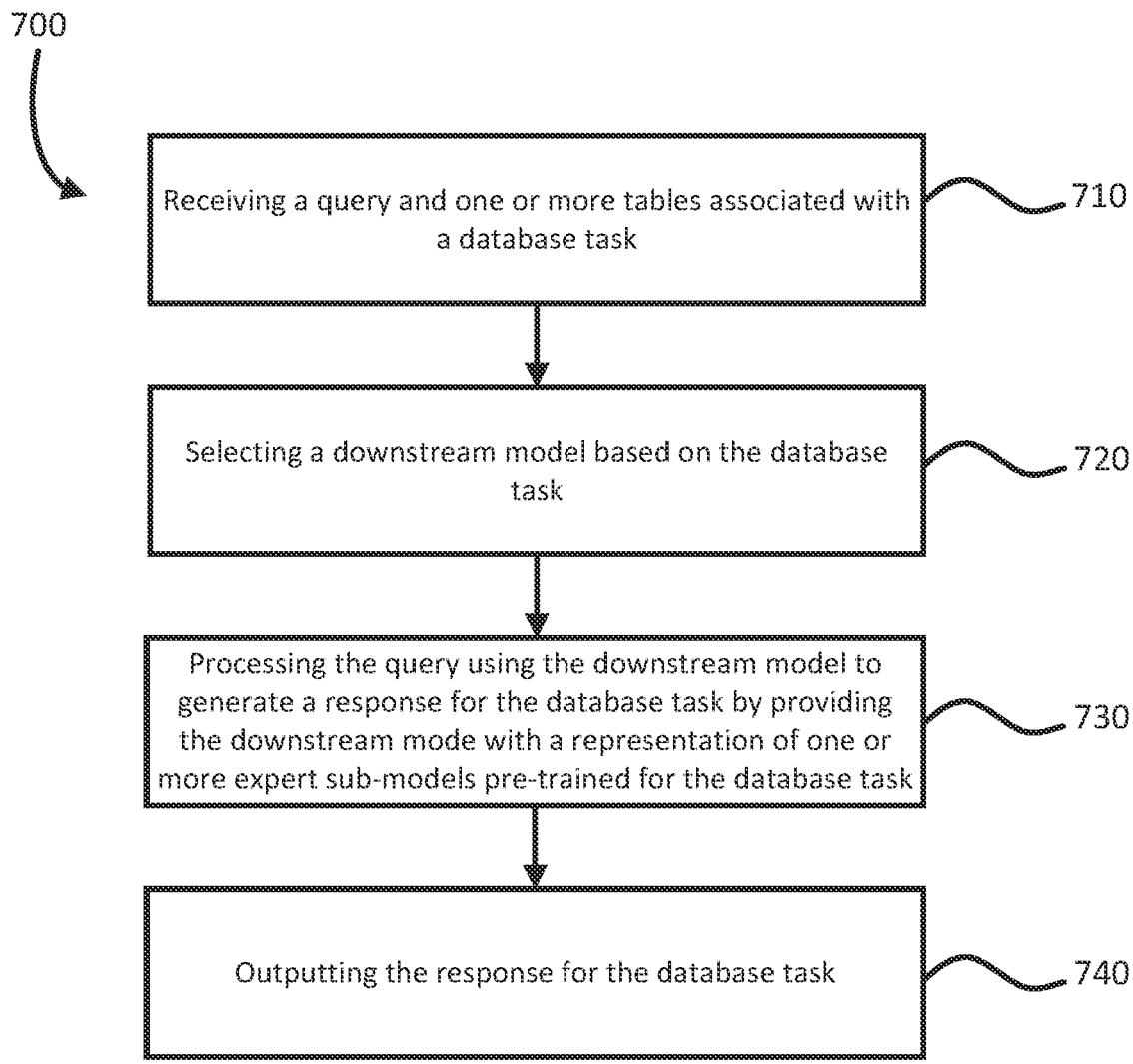
FIG. 7 depicts a flow diagram of an example process for serving a foundation model for learned database tasks according to aspects of the disclosure.

FIG. 7 depicts a flow diagram of an example process 700 for serving a foundation model for learned database tasks. The example process 700 can be performed on a system of one or more processors in one or more locations, such as the database foundation model system 200 as depicted in FIG. 2.

As shown in block 710, the database foundation model system 200 receives a query and one or more tables associated with a database task. As examples, the database task can include cardinality estimation, approximate query answering, partitioning advisors, knob tuning, query scheduling, query optimization, runtime estimation, index selection, data imputation, text-to-structured query language (SQL), and/or query rewriting.

As shown in block 720, the database foundation model system 200 selects a downstream model based on the database task. The downstream model can be trained and/or fine-tuned for the database task. Further, a downstream model can be one of a plurality of downstream models that are part of the foundation model, where each downstream model can be trained and/or fine-tuned for a particular database task.

As shown in block 730, the database foundation model system 200 processes the query based on the one or more tables using the downstream model to generate a response for the database task. The database foundation model system 200 provides the downstream model with a representation of one or more expert sub-models pre-trained for the database task.

The one or more expert sub-models can include base experts and/or derived experts. The base experts include machine learning models respectively pre-trained in isolation from other expert sub-models. Example base experts can include data experts and/or resources experts. The derived experts include machine learning models respectively pre-trained using representations derived from other expert sub-models. Example derived experts can include physical plan experts and/or logical plan experts. The representation of one or more expert sub-models can include a combination of at least one base expert and at least one derived expert that is dependent on the base expert.

As shown in block 740, the database foundation model system 200 outputs the response for the database task.

Aspects of this disclosure can be implemented in digital electronic circuitry, in tangibly embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, that is generated to encode information for transmission to suitable receiver apparatus for execution by a data processing apparatus.

The term "configured" is used herein in connection with systems and computer program components. For a system of one or more computers to be configured to perform particular operations or actions means that the system has installed thereon software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "data processing apparatus" or "data processing system" refers to data processing hardware and encompasses various apparatus, devices, and machines for processing data, including programmable processors, computers, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a standalone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" refers to a software-based system, subsystem, or process that is programmed to perform one or more specific functions. The engine can be implemented as one or more software modules or components or can be installed on one or more computers in one or more locations. A particular engine can have one or more computers dedicated thereto, or multiple engines can be installed and running on the same computer or computers.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers.

A computer or special purpose logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for serving a foundational model for learned database tasks, the method comprising:
receiving, by one or more processors, a query and one or more tables associated with a database task;
processing, by the one or more processors, the query and the one or more tables using one or more expert sub-models to generate a representation of the query and the one or more tables, the one or more expert sub-models each associated with a different aspect of various database tasks;
selecting, by the one or more processors, a downstream model from a plurality of downstream models based on the database task, the plurality of downstream models forming the foundational model, each downstream model associated with a different database task;
processing, by the one or more processors, the representation using the downstream model to perform the database task and generate a response for the query; and
outputting, by the one or more processors, the response for the query.

2. The method of claim 1, wherein the database task comprises at least one of cardinality estimation, approximate query answering, partitioning advisors, knob tuning, query scheduling, query optimization, runtime estimation, index selection, data imputation, text-to-structured query language (SQL), or query rewriting.

3. The method of claim 1, wherein the one or more expert sub-models comprise base experts that process the query and the one or more tables in isolation to generate one or more intermediary representations and derived experts that process the intermediary representations to generate the representation of the query and the one or more tables.

4. The method of claim 3, further comprising pre-training, by the one or more processors, the base experts respectively on different aspects of various database tasks in isolation from other expert sub-models.

5. The method of claim 3, wherein the base experts comprise at least one of data experts configured to summarize the one or more tables as a vector in latent space or resources experts configured to represent performance of hardware resources for processing the query as a vector in latent space.

6. The method of claim 3, further comprising pre-training, by the one or more processors, the derived experts respectively on different aspects of various database tasks using intermediary representations derived from other expert sub-models.

7. The method of claim 3, wherein the derived experts comprise at least one of physical plan experts configured to enrich the intermediary representations with a complexity of processing the query or logical plan experts configured to represent how query operators transform the one or more tables.

8. The method of claim 3, further comprising combining, by the one or more processors, the intermediary representations to generate the representation of the query and the one or more tables.

9. The method of claim 1, further comprising training, by the one or more processors, the downstream model for the database task.

10. The method of claim 1, wherein the representation of the query and the one or more tables is a vector representation.

11. A system comprising:
one or more processors; and
one or more storage devices coupled to the one or more processors and storing instructions that, when executed by the one or more processors, cause the one or more processors to perform operations for serving a foundational model for learned database tasks, the operations comprising:
receiving a query and one or more tables associated with a database task;
processing the query and the one or more tables using one or more expert sub-models to generate a representation of the query and the one or more tables, the one or more expert sub-model each associated with a different aspect of various database tasks;
selecting a downstream model from a plurality of downstream models based on the database task, the plurality of downstream models forming the foundation model, each downstream model associated with a different database task;
processing, by the one or more processors, the representation using the downstream model to perform the database task and generate a response for the query; and
outputting the response for the query.

12. The system of claim 11, wherein the database task comprises at least one of cardinality estimation, approximate query answering, partitioning advisors, knob tuning, query scheduling, query optimization, runtime estimation, index selection, data imputation, text-to-structured query language (SQL), or query rewriting.

13. The system of claim 11, wherein the one or more expert sub-models comprise base experts that process the query and the one or more tables in isolation to generate one or more intermediary representations and derived experts that process the intermediary representations to generate the representation of the query and the one or more tables.

14. The system of claim 13, wherein the operations further comprise pre-training the base experts respectively on different aspects of various database tasks in isolation from other expert sub-models.

15. The system of claim 13, wherein the base experts comprise at least one of data experts configured to summarize the one or more tables as a vector in latent space or resources experts configured to represent performance of hardware resources for processing the query as a vector in latent space.

16. The system of claim 13, wherein the operations further comprise pre-training the derived experts respectively on different aspects of various database tasks using intermediary representations derived from other expert sub-models.

17. The system of claim 13, wherein the derived experts comprise at least one of physical plan experts configured to enrich the intermediary representations with a complexity of processing the query or logical plan experts configured to represent how query operators transform the one or more tables.

18. The system of claim 13, wherein the operations further comprise combining the intermediary representations to generate the representation of the query and the one or more tables.

19. The system of claim 11, wherein the representation of the query and the one or more tables is a vector representation.

20. A non-transitory computer readable medium for storing instructions that, when executed by one or more processors, cause the one or more processors to perform operations for serving a foundational model for learned database tasks, the operations comprising:
receiving a query and one or more tables associated with a database task;
processing the query and the one or more tables using one or more expert sub-models to generate a representation of the query and the one or more tables, the one or more expert sub-models each associated with a different aspect of various database tasks;
selecting a downstream model from a plurality of downstream models based on the database task, the plurality of downstream models forming the foundational model, each downstream model associated with a different database task;
processing the representation using the downstream model to perform the database task to generate a response for the query; and
outputting the response for the query.

* * * * *